(12) United States Patent
Zhao (10) Patent No.: US 11,254,003 B1
(45) Date of Patent: Feb. 22, 2022

(54) ENHANCED ROBOT PATH PLANNING

(71) Applicant: Intrinsic Innovation LLC, Mountain View, CA (US)

(72) Inventor: Xingtao Zhao, Menlo Park, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 159 days.

(21) Appl. No.: 16/388,672

(22) Filed: Apr. 18, 2019

(51) Int. Cl.
 *B25J 9/16* (2006.01)
(52) U.S. Cl.
 CPC .................. *B25J 9/1666* (2013.01)
(58) Field of Classification Search
 CPC ..... B25J 9/1666; B25J 9/1664; G05D 1/0214; G05D 1/0212
 See application file for complete search history.

(56) References Cited

U.S. PATENT DOCUMENTS

| | | | |
|---|---|---|---|
| 5,434,489 A | | 7/1995 | Cheng et al. |
| 6,004,016 A | * | 12/1999 | Spector .................. B25J 9/1666 700/247 |
| 6,259,988 B1 | | 7/2001 | Galkowski et al. |
| 6,604,005 B1 | | 8/2003 | Dorst et al. |
| 7,130,716 B2 | | 10/2006 | Rogers et al. |
| 9,079,303 B2 | | 7/2015 | Abramson et al. |
| 9,229,454 B1 | | 1/2016 | Chiappetta et al. |
| 2007/0030271 A1 | * | 2/2007 | Kamiya .................. B25J 9/1664 345/442 |
| 2008/0039974 A1 | | 2/2008 | Sandin et al. |
| 2008/0079383 A1 | | 4/2008 | Nakamoto |
| 2009/0306881 A1 | | 12/2009 | Dolgov et al. |
| 2017/0181383 A1 | | 6/2017 | Shen et al. |

(Continued)

FOREIGN PATENT DOCUMENTS

| | | | |
|---|---|---|---|
| CN | 102169347 | | 3/2011 |
| CN | 109434840 A | * | 3/2019 |
| EP | 1733287 | | 1/2010 |

OTHER PUBLICATIONS

Fleisch et al., "Interactive Optimization of Path Planning for a Robot Enabled by Virtual Commissioning," Evolutionary and Deterministic Methods for Design Optimization and Control with Applications to Industrial and Societal Problems, Springer International Publishing, 2019, ISBN: 978-3-319-89889-6; pp. 339-354.

(Continued)

*Primary Examiner* — Khoi H Tran
*Assistant Examiner* — Nhi Q Bui
(74) *Attorney, Agent, or Firm* — Fish & Richardson P.C.

(57) ABSTRACT

Methods, systems, and apparatus, including computer programs encoded on computer storage media, for enhanced path planning. In some implementations, a first path is determined for travel by a robot, the first path extending from an origin to a destination. Path segments are determined based on the first path. A corner between two of the path segments has an angle less than a predetermined threshold is determined. In response to determining that the corner between two of the path segments has an angle less than the predetermined threshold, a bypass path segment is determined that bypasses the corner. A second path for the robot to travel is determined based on the path segments and the bypass path segment. Data indicating the second path is provided to the robot.

19 Claims, 6 Drawing Sheets

(56) References Cited

U.S. PATENT DOCUMENTS

2018/0200888 A1\* 7/2018 Kim ..................... A47L 9/2857
2019/0176328 A1\* 6/2019 Kichkaylo ............. B66F 9/063

OTHER PUBLICATIONS

Khan et al., "On Complete Coverage Path Planning algorithms for Non-holonomic Mobile Robots: Survey and Challenges," J. Inf, Sci. Eng., 2017, 23 pages.
Richardson et al., "Iterative Path Optimization for Practical Robot Planning," IEEE, RSJ International Conference on Intelligent Robots and Systems, 2011, 6 pages.
Oh et al., "Strict Theta: Shorter Motion Path Planning Using Taut Paths," 26th International Conference on Automated Planning and Scheduling, 2016, 5 pages.
Andres-Perez et al., "Evolutionary and deterministic methods for design optimization and control with applications to industrial and societal problems." Evolutionary and Deterministic Methods for Design Optimization and Control With Applications to Industrial and Societal Problems, Computational Methods in Applied Sciences, 2019, 49:339-354.

\* cited by examiner

FIG. 6

ENHANCED ROBOT PATH PLANNING

BACKGROUND

This specification relates generally to enhanced robot path planning.

Robots can be configured to perform a variety of tasks. Robots generally need some form of perception to complete a task, such as sensors and a capability for recognition or identification of an object or obstacle. Robots may encounter objects and situations in which they need to maneuver to effectively accomplish their tasks.

SUMMARY

In some implementations, a robotic system can use an optimization technique to improve the efficiency of a planned path of motion, for example, by reducing the distance and/or time required. To obtain an efficient path, the system may iteratively identify and remove the sharpest changes in direction along a path, in order to smooth and shorten the path. This technique is referred to as a corner cutting technique, which can be used to generate efficient paths for moving through an area. Part of generating a path can include determining an initial path for a robot or a portion of a robot to travel. The initial path is then enhanced by removing inefficient corners, e.g., turns, transitions, or changes in direction or speed of movement that fail to meet certain criteria. The path-planning process can include analysis that identifies corners in the initial path that meet predetermined criteria. For example, sharp turns or transitions having an angle less than a threshold can be identified. Each of the identified corners is then removed by substituting an alternate path segment that avoids the corner, typically with a shorter segment that bypasses the corner. This results in a path that is more efficient because the replacement segment has a shorter distance than the segment it replaces, and also avoids the need for abrupt changes in movement by the robot. The corner-cutting process can take into account the presence of potential obstacles to ensure that the optimized path can be successfully traversed. In some implementations, the corner-cutting process can be performed iteratively, to successively replace portions of a path being developed until inefficient corners have been removed.

With the path planning techniques discussed below, a robot can obtain a path that allows the robot to efficiently move to a desired destination while avoiding obstacles in the environment. The robot can first analyze the environment and determine the location of objects that may represent potential obstacles. The robot can provide this information to a server system that determines a path that avoids the obstacles and reaches the desired destination. The server system can also refine the path with localized shortcuts that remove the sharpest corners of the initial path, then provide the refined path to the robot. The corners that are removed may be vertices where path segments intersect, but may also more generally can be portions of a path representing turns, transitions, or other changes in direction or speed of movement. Thus a "corner" is not limited to an intersection of two lines, but can refer to a region of transition from one path direction to another. The path that is planned and optimized may be for travel of the entire robot, e.g., for locomotion of the robot from one location to another. The path that is planned and optimized may be for movement of a part of a robot, such as a translation and/or rotation of a portion of the robot, such as an arm.

As an example of a corner cutting process, the server system can identify sharp corners along a path, e.g., transitions that are more abrupt than allowed by predetermined criteria. The server system identifies sharp corners by comparing the magnitude of the angles between path segments to a predetermined threshold. The server system removes regions of the path having corners with angles determined to be less than the threshold. A corner can be removed by inserting a new path portion that bypasses the area of the path where path segments formed the corner. In some implementations, this is done by adding a bypass path segment that is parallel to a line between two points or vertices located on the path, the two points or vertices respectively occurring before and after corner along the path. The server system performs this process of identifying and bypassing corners iteratively until each transition along the path meets the desired criteria (e.g., the remaining angles in the path are greater than a predetermined threshold) to the extent allowed by the obstacles.

In some implementations, path generation uses straight-line segments to model a path of motion, and optimization by cutting corners is applied to the straight-line segments. This can allow very high computational efficiency and high speed for path planning due to the relative simplicity of line segments compared to curves and other types of path segments. Once a line-based path has been obtained, additional smoothing techniques and refinements may be applied to determine a final path when appropriate. However, the technique of cutting corners is not limited to the optimizing of paths composed of straight lines. A corner can be a region of the path where a direction of travel changes, even if the change takes place over a curve or segment rather than a discrete point. Even in paths defined by curves, portions of the path where the change in direction over a given distance exceeds a threshold can be considered to represent corners that can be removed to improve path efficiency.

The motion planning techniques discussed herein can be used effectively to plan efficient paths through two-dimensional areas, such as for a robot moving around a room. The same techniques can be used to plan efficient paths in three-dimensional space, such as for movements of a robotic arm that manipulates objects in a three-dimensional workspace. Additionally, these same techniques can be used to plan efficient paths in higher dimensional parameter space, such as joint dimensional space. In other words, in addition to locomotion of a robot, any robot motion may be enhanced replacing inefficient corners, including movements of components of robots that have movable parts attached to a fixed or stationary base.

In a general aspect, a method includes: determining a first path for travel by a robot, the first path extending from an origin to a destination; determining path segments based on the first path; determining that a corner between two of the path segments has an angle less than a predetermined threshold; in response to determining that the corner between two of the path segments has an angle less than the predetermined threshold, determining a bypass path segment that bypasses the corner; determining a second path for the robot to travel based on the path segments and the bypass path segment; and providing, to the robot, data indicating the second path.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the method includes determining path segments based on the first path includes determining a series of connected line segments that each begin and end on the first path, wherein the series of connected line segments provides a path that reduces the length of the first path.

In some implementations, the method includes identifying a location of an obstacle in proximity to the first path. The bypass path segment is determined based at least in part on the location of the obstacle.

In some implementations, determining the bypass path segment that bypasses the corner includes: identifying a first vertex of the path segments that is located before the corner; identifying a second vertex of the path segments that is located after the corner; and determining the bypass path segment to have an orientation parallel to a line between the first vertex and the second vertex.

In some implementations, the path is a path for movement of a robotic arm of the robot.

In some implementations, the path is a path for locomotion of the robot.

In some implementations, the method includes identifying each corner between the path segments; determining an angle of each identified corner; comparing each angle to an angle threshold; and based on the comparisons, determining a bypass line segment to bypass each corner having an angle that is less than the angle threshold.

In some implementations, determining the first path for travel by the robot further includes generating, by the one or more computers, mapping data provided by the data indicating one or more obstacles in proximity to the first path.

In some implementations, determining the second path includes determining a second path that specifies movement in two dimensions.

In some implementations, determining the second path includes determining a second path that specifies movement in three dimensions.

In some implementations, determining the second path includes determining a second path that specifies movement along six dimensions.

In some implementations, determining the bypass line segment includes generating a bypass line segment that is parallel to a line between two other vertices along the path segments, wherein the additional line segment is placed as far away from the corner and as close to an obstacle as allowable without colliding with the obstacle.

In some implementations, the method includes generating, by the one or more computers, data indicating one or more virtual obstacles, wherein the second path is generated to avoid the regions corresponding to the one or more virtual obstacles.

In some implementations, the data representing the second path is defined in Cartesian space, and movement along the second path represents translational movement.

In some implementations, the data representing the second path is defined in a rotational space or a joint movement space, and movement along the second path represents rotation or articulation of a joint.

In some implementations, determining the bypass path segment includes determining the bypass path segment based on: an amount of area of a triangle defined by the path segments that define the corner, a path distance along the path segments, and an amount of area within the triangle that would be removed by the bypass path segment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
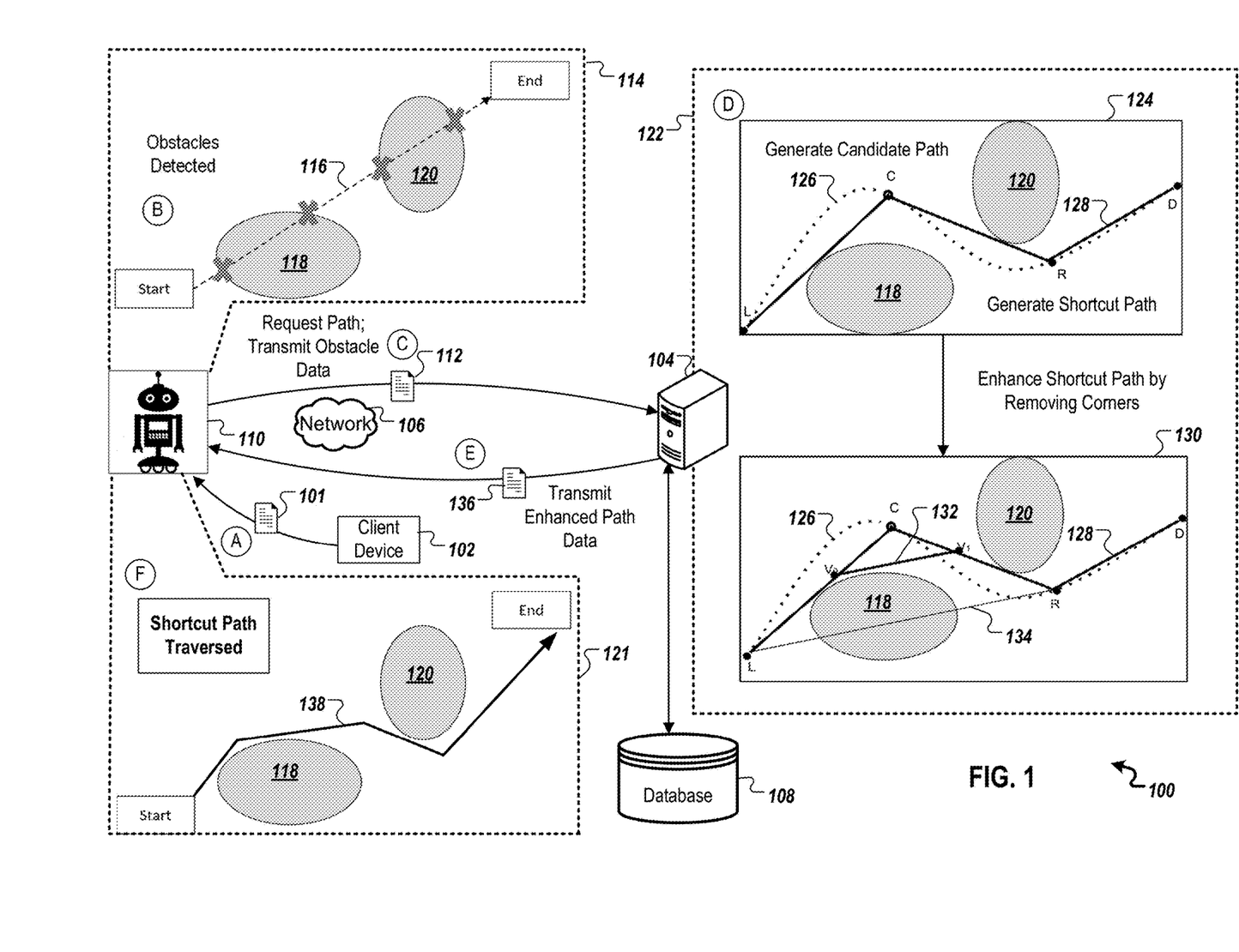
FIG. 1 is a block diagram that illustrates an example of a system for enhanced path planning.

FIG. 1 is a block diagram that illustrates an example of a system 100 for enhanced path planning. The system includes a client device 102, a server system 104, a network 106, a database 108, and a robotics system 110. The example shown in illustrated system 100 shows the client device 102 instructing the robotics system 110 (referred to simply as robot 110 below) to perform a particular movement. The robot 110 interacts with the environment to determine an enhanced, shortcut path that avoids one or more obstacles. The enhanced path can be determined by cutting corners from a candidate path, e.g., by removing corners that have an angle less than a threshold. The example of FIG. 1 shows a single robot 110 interacting with an environment, but the system 100 can also include multiple robotics systems interacting with an environment and/or with each other. FIG. 1 illustrates various operations in stages (A) to (F), which can be performed in the sequence indicated or in another sequence.

In general, a robot refers to a programmable machine with one or more components that can be capable of performing a series of actions at least partially autonomously. For example, a robot may be capable of carrying out tasks that involve interacting with an object, changing a physical surrounding of the robot (e.g., arranging or manipulating objects), and maneuvering around the physical surround of the robot in an efficient manner. Besides responding to inputs and commands from humans, robots may initiate actions of their own accord, based on their programming and the conditions they detect. A robot, such as the robot 110, may include one or more components for interacting with (e.g., physically manipulating and maneuvering) objects in its environment. For example, a robot may include an arm with an actuator to grasp or otherwise move objects. The actuator may be a robotic hand with finger-like elements to grasp objects. In some implementations, the arm can include one or more components that allow an end effector of the arm to move in 6-degrees of freedom (DOF).

A robot, such as the robot 110, can include one or more motorized elements, such as wheels, legs, continuous tracks, and so on, to allow the robot to travel from one location to another while avoiding obstacles. The robot may include navigational components, such as GPS and accelerometers, allowing the robot to set a movement course and travel along a self-directed path. The robot may include sensory capabilities that includes one or more sensors connected externally to the robot, allowing the robot to perceive its surroundings. The robot can include one or more body components, such as a chassis and other connecting components. The body components may allow for various types of motion of robot components relative to each other, such as rotating, swiveling, shifting, etc. Robots can include various other components, such as batteries to power the robot, transmitters, receivers, sensors, data processors, and memory to store programmed instructions for the robot.

In the example of FIG. 1, a path is planned for the robot 110 to move from a starting location to an ending location. The objective of moving to the ending location can be based on an instruction from a user, a determination by the robot to move in order to complete a task, data from a server system or planning system, or other data. The path may be a path for the robot to move its body to travel from one location to another location (e.g., for the entire robot 110 to be translated to the ending location). Additionally or alternatively, the path may represent movement of only a portion of the robot 110, such as movement of one of the robot's components, such as arm and manipulator, from a starting location to an ending location. The path may specify changes in location as well as pose or configuration of the robot, such as moving the robot from, for example, a living room to the dining room and also moving the robotic arm from a starting height to an ending height while travelling between rooms.

In the example of FIG. 1, path planning and path optimization is performed by the server system 104. In some implementations, path planning and path optimization may be performed by processors of the robot 110. In some implementations, path planning and path optimization tasks may be shared by or distributed among the robot 110 and the server system 104.

As an overview, FIG. 1 illustrates generating an efficient path from a start location to an end location while avoiding one or more obstacles. The example of FIG. 1 involves the robot 110 detecting obstacles in the environment and indicating the obstacles to the server system 104. The server system 104 determines a collision-free path 126 from the location of the robot to the ending location, then generates a shortcut path 128 using line segments. This shortcut path 128 reduces the length of the path 126 while still avoiding the obstacles. The server system 104 then uses a corner-cutting technique to refine the shortcut path 128 further, e.g., by removing the sharpest corners between segments of the shortcut path 128. The server system 104 then provides path data 136 for a final path 138 to be traversed by the robot 110.

During stage (A), a destination for the robot 110 is determined. The destination may be specified by a user, such as a user of the client device 102, or may be determined by the robot 110 or the server system 104. For example, in a manufacturing setting, the robot 110 may be assigned a task in order to advance production of an item, and the robot 110 or the server system 104 may determine that the robot 110 or a portion of the robot 110 should move to a particular position as part of performing the task. A destination for the robot 110 may be determined in other ways, such as a user instructing the robot to move, with a voice command, interaction with a device, or direct interaction with the robot 110.

During stage (B), the robot 110 observes its environment and identifies potential obstacles, e.g., objects that may interfere with travelling to the destination. For example, the robot 110 obtains data from its sensors that indicate objects located between the robot's current location and the destination determined in stage (A). For example, to move to a destination across a room, the robot 110 determines that one or more obstacles 118, 120 are present which would block a straight-line path to the destination. Detecting the obstacle may cause the robot 110 or another system to initiate path planning and optimization in order to generate a path that reaches the destination and avoids the obstacle. If no obstacles exist in the straight-line path, the robot 110 can proceed to traverse the straight-line path.

In some implementations, the robot 110 analyzes the environment using one or more sensors integrated into or in communication with the robot 110. In some implementations, the sensors can be fixed location sensors placed around the robot environment, or external sensors that are mounted on the robot or otherwise detached from the robot. The sensors can include a camera, a LIDAR sensor, a radar sensor, a proximity sensor, an infrared sensor, an accelerometer, a touch sensor, a microphone, a depth camera, and a position sensor, to name a few examples. Other types of sensors may be used. For example, the robot 110 can include RGBD sensors that capture red, blue, and green image data as well as depth data. The robot 110 analyzes sensor data to determine the obstacles along the straight-line path from the robot's current location to the destination. The robot 110 may assess location, shape, color, size, volume, contour, texture, and other aspects of objects to detect and identify objects.

The robot 110 processes the sensor data to generate characteristics of obstacles in the environment. For example, as illustrated in system 100, after the robot has captured sensor data of the obstacles, such as obstacles 118 and 120, along the straight-line path 116, the robot 110 processes the sensor data to identify characteristics of the environment. The robot 110 generates obstacle data 112 from the characteristics of the sensor data. The obstacle data 112 may include a representation of the location, color, size, contour, depth, and texture data for the obstacles 118 and 120, as noted from the sensors.

During stage (C), the robot 110 sends a request for the server system 104 to determine path for the robot 110 to travel. The robot 110 provides obstacle data 112 to the server system 104. The obstacle data 112 can indicate a location of identified obstacles 118, 120 as well as a size and/or shape of the obstacles. The obstacle data may indicate other properties of the obstacles 118, 120, such as a recognized type or category of the obstacles 118, 120. In some implementations, the robot 110 sends sensor data and/or map data to the server system 104, allowing the server system 104 to determine the locations and sizes of the obstacles 118, 120. The robot 110 can provide other information to the server system 104 such as data indicating the current location of the robot 110, data indicating the destination for the robot, an identifier for the robot, a task or instruction the robot 110 is attempting to carry out, and so on.

During stage (D), the server system 104 generates a path for the robot 110. The server system 104 can employ a combination of path-planning algorithms that generates a path from the starting location to the ending location while avoiding obstacles 118 and 120. In the example, the path is generated in response to the request from the robot 110. Of course, path planning is not required to be performed in response to a robot request, and can be initiated in the first instance by the server system 104 or another system, such as when planning future robot movements to assemble or otherwise manufacture an item.

The server system 104 can generate the path using a number of different steps, including (1) generating a candidate path 126, (2) generating a shortcut path 128 that reduces the length of the candidate path 126, and (3) enhancing the shortcut path by bypassing corners in the shortcut path 126. Each of these steps can take into account the size and location of obstacles 118 and 120 to avoid collisions.

To generate the candidate path 126 (illustrated by the dotted line from the starting location to the ending location), the server system 104 can use one or more path-planning algorithms, such as the A* algorithm, Dijkstra's algorithm, forward search, backward search, bidirectional search, value iteration, and/or logic-based planning. The server system 104 may use one of these path-planning algorithms to generate the path 126 from the starting location of the robot 110 to the ending location while avoiding one or more obstacles. The collision-free candidate path 126 can include any combination of curves, undulations, straight portions, and ripples, to name a few examples, in order to navigate around the obstacles 118 and 120.

After generating the candidate path 126, the server system 104 generates a shortcut path 128 that is more direct than the candidate path 126. For example, the server system 104 generates a shortcut path 128 that shortens the distance to be traversed. The server system 104 can generate a series of line segments to form the shortcut path 128. For example, the server system 104 can define the first point of the first line segment at the starting point, L. The second point of the first line segment is determined by following the path 126 as far as possible without causing a line from point L to interfere with the obstacle 118. This point, C, becomes the end point of the first line segment AC. The point C is the starting point for the second line segment, and the end point for the next segment is the point R, the farthest point along the path where a line from point C can be drawn that does not interfere with the obstacle 120. From point C, the final line segment extends to the destination.

As a result, the straight line segments of the shortcut path 128 specify a path as close to the obstacles as possible, while still meeting criteria for acceptable proximity, e.g., while still avoiding a collision. For example, along path 128, the first segment illustrates a straight line that is within proximity to the obstacle 118 without colliding with the obstacle 118. Thus, the path 128 can include one or more straight line segments that connect to points along the results of the path-planning algorithm (e.g., path 126).

The server system 104 further refines the shortcut path 128 by applying a corner cutting algorithm. The cutting corners path algorithm seeks to avoid or bypass sharp angles in the path 128. The cutting corners path algorithm shortens the distance of the path 128 and smooths the sharp corners of the path 128.

To apply the corner cutting technique, the server system identifies the corners in the path 128 and determines the angles of those corners. Each vertex where line segments meet on the path 128 can be identified as a corner, and the angle for each can be determined. In the example, there are two corners identified, one at point C and another at point R.

After identifying the corners on the path 128, the server system 104 identifies the corner that has the sharpest angle, e.g., the smallest angle between the two line segments that meet at the corner. The server system 104 then determines a bypass line segment 132 that bypasses the identified corner. The location and orientation of the bypass line segment 132 can be determined based on the detected obstacles and the vertices of the path 128, as discussed below.

The orientation of the bypass line segment 132 can be determined based on the vertices on opposite sides of vertex C. In this example, those vertices are vertex L, occurring immediately before vertex C, and vertex R, occurring immediately after vertex C. The server system 104 determines an orientation of a line 134 between vertices L and R (e.g., line LR), and then sets the orientation of the bypass line segment 132 parallel to the line 134.

The locations where the bypass line segment 132 intersects the path 128, e.g., vertices $V_0$ and $V_1$ which are respectively located along lines LC and CR, can be set as far away from the corner at vertex C as possible without interfering with an obstacle. In other words, the bypass line segment 132 can be set as a line segment parallel to the line 134 that is farthest from vertex C and still provides a collision-free path. In the example, the server system 104 determines the position as far down from vertex C as possible before reaching the obstacle 118.

Variations of the technique for determining the corner-cutting line segment 132 can be used. For example, in some implementations, the server system 104 may select points on LC and CR such that the bypass line segment 132 is not parallel to line segment 134. To better avoid the obstacle 118, the server system 104 may select a point on line LC closer to vertex C and may select a point on line CR closer to vertex R. As another example, the server system 104 may generate a different bypass line segment that connects a point on line LC to a point and a point on line RD, entirely bypassing line CR. By doing so, the bypass line segment from line LC to line RD may make corner C and corner R less abrupt, and provide a shorter distance for travel, while still avoiding the obstacles 118 and 120.

The server system 104 may take into account other criteria in determining a bypass line segment. For example, a preference for the robot 110 may indicate a preference for optimizing one or more of speed of travel, minimizing path distance, fewer turns or rotations by the robot 110, fewer changes of robot pose, avoidance of certain areas or robot positions, and so on. These preferences may be indicated for the robot 110 generally, or may vary for different tasks, areas traveled, users of the robot 110, and so on. In some implementations, a user can designate one or more preferences for generating cutting corners. For example, the user can interact with the client device 102 through an application that communicates with the server system 104. When generating bypass line segments, the server system 104 can also take into account capabilities and limitations of the robot 110, such as range of motion, available poses or configurations for the robot, speed and acceleration characteristics, and so on in order to specify a bypass segment that satisfies the desired criteria given the particular characteristics of the robot 110.

As illustrated in representation 130, the selected bypass line segment 132 provides an alternate path that avoids the corner C on path 128. The new line segment 132 extends between vertices $V_0$ and $V_1$, which are respectively along lines LC and CR. The updated path resulting from the corner-cutting algorithm extends from the starting location at point L to vertex $V_0$, then to vertex $V_1$, then to vertex R, and finally to vertex D which is the destination. The new enhanced path is smoother and shorter than the candidate path 126 and the initial shortcut path 128. For example, the angle $\sphericalangle LV_0V_1$ is greater than the angle $\sphericalangle LCR$. Additionally, the angle $\sphericalangle V_0V_1R$ is greater than angle $\sphericalangle LCR$. The enhanced path (e.g., shortcut path 128 modified to include the bypass line segment 132) is also shorter than path 126 and the path 128. For example, the distance generated by the sum of the distances between the points L to $V_0$, $V_0$ to $V_1$, and $V_1$ to R is less than the sum of the distances between the points L to C and C to R.

The same corner-cutting process described for the angle at vertex C can be performed for multiple corners of the shortcut path 128. In some implementations, the server system 104 seeks to bypass the sharpest corners (e.g., those with the smallest included angles) found on the shortcut path 128. By bypassing the sharpest corners on path 128, the enhanced path is smoother and shorter, while still avoiding the obstacles 118 and 120. For example, the server system 104 compares the magnitude of each of the angles to a predetermined threshold representing a minimum angle that is allowed for corners along the shortcut path 128. For each corner having an angle value less than the predetermined threshold (e.g., indicating a sharper corner than represented by the threshold), the server system bypasses or "cuts" the corner to remove that corner from the shortcut path 128. After bypassing the sharpest corner at vertex C, the server system 104 determines whether any other corners along the shortcut path 128 have angles less than the threshold and bypasses them using the same techniques used to bypass the corner at vertex C.

The server system 104 can proceed to bypass corners in an iterative manner, bypassing the next sharpest corner until desired criteria for the path are reached. In some implementations, the server system 104 evaluates new corners created by bypass line segments and may bypass those corners if the angles are less than the threshold. For example, the server system 104 identifies one or more corners on the enhanced path that includes the vertices L, $V_0$, $V_1$, R, and D. The server system 104 identifies angles along this enhanced path, for example, $\angle V_0V_1$, $\angle V_0V_1R$, and $\angle V_1RD$. From each of the identified angles, the server system 104 determines a magnitude for each of these angles. The server system 104 compares the magnitude for each of the angles to a predetermined threshold. The comparison for a corner indicates whether the corner should be bypassed or retained in the path. For example, if the magnitude of the angle is greater than the predetermined threshold, then the server system 104 determines that the corner does not need to be removed. Alternatively, if the server system 104 determines that magnitude of the angle is less than the predetermined threshold, then the server system 104 determines that the identified angle is too sharp and is to be removed. The server system 104 performs this threshold comparison to the magnitude of each angle found in the enhanced path. For example, the predetermined threshold can be set to a magnitude of 60 degrees. In some implementations, a user can set the predetermined threshold by interacting with the client device 102. The user can edit the threshold and store the predetermined threshold in a configuration file, for example, at the server system 104.

In the event that the server system 104 determines that at least one of the magnitudes of the angles along the enhanced path is less than the predetermined threshold, the server system 104 may perform the steps of generating a bypass line segment (e.g., as done for bypass line segment 132), to remove the corner having an angle less than the predetermined threshold. Alternatively, in the event that the server system 104 determines that each of the magnitudes of the angles along the enhanced path is greater than or equal to the predetermined threshold, the server system 104 finalizes the enhanced path based on the current set of line segments.

In some implementations, the server system 104 generates one or more scores that characterize properties of the enhanced path. These scores may be generated at various points during the path planning process to evaluate different iterations of the enhanced path, and may be used to determine whether the enhanced path sufficiently meets criteria or constraints for the path. A score can be based on any of various factors, such as smoothness, path distance, a number of turns, magnitudes of angles along the enhanced path, and so on. For example, the score of the enhanced path may increase and decrease based on values indicative of one or more of these factors. For example, the smoother and the shorter the enhanced path is, the higher the score generated by the server system 104. Additionally, the fewer number of turns in the enhanced path increases the score of the enhanced path. Also, the greater the magnitude of each angle found along the enhanced path increases the score. In some implementations, the server system 104 may generate multiple enhanced paths and score each of the generated enhanced paths. The server system 104 can select the enhanced path with the highest score to provide to the robot 110. As another example, the score for each iteration of the enhanced path may be compared to a threshold score representing a desired combination of path characteristics. When the score for an enhanced path reaches the threshold level, the server system 104 can determine that the path sufficiently meets the applicable criteria and so the server system 104 ends the optimization process. Similarly, if the server system 104 determines that the scores for successive iterations of the enhanced path reach a plateau or decrease, indicating that further optimization is not improving the path, the server system may also end the optimization process.

The server system 104 may optionally apply further refinements to the enhanced path, which is formed of line segments from the shortcut path 128 and typically one or more bypass line segments. One of the advantages of defining the path in this manner is that the path may be specified in a very compact and efficient representation as a series of coordinates representing the vertices of the enhanced path. This simple representation can aid processing, storage, and transmission of path data using minimal computing resources and communication bandwidth. Nevertheless, the robot 110 is not required to travel in linear segments, and the server system 104 and/or the robot 110 may apply additional rules or algorithms to smooth or reshape the enhanced path. For example, portions of the enhanced path may be converted into a different representation, such as curves, splines, a set of more fine-grained waypoints, and so on.

In some implementations, the server system 104 stores data in the database 108 in response to the server system 104 generating results of the cutting corners path algorithm. For example, the server system 104 stores the data relating to the results of the cutting corners path algorithm. This data can include the vertices of the resultant line, data representing the enhanced path, such as GPS location coordinates of the enhanced path, sensor data provided by the sensors of the robot 110, and so on. Additionally, the server system 104 stores robotic movement data that indicates a portion of the robot 110 that moves along the enhanced path, such as a robotic arm or the chassis of the robot 110.

The server system 104 also stores obstacle data and environmental data of the representation 114. For example, the environment data of representation 114 can include GPS data indicating the starting location of the robot 110, the ending location, and any other GPS data representative of the environment as seen by the robot 110. The server system 104 also can store corresponding obstacle data. The obstacle data can include data indicating a type or classification of the obstacle, and GPS location data indicating the location of each of the obstacles, such as obstacles 118 and 120.

During stage (E), the server system 104 transmits the enhanced path data 136 representing the results of the path planning algorithm to the robot 110 over the network 106. The enhanced path data 136 can include the coordinates specifying points along the enhanced path. For the illustrated example, the enhanced path data 136 may indicate coordinates for vertices L, $V_0$, $V_1$, R, and D. These coordinates may be GPS coordinates or may be expressed in another coordinate frame, for example, with respect to a mapping data used by the robot 110. In some implementations, the server system 104 can store the enhanced path data 136 in the database 108 and provide to the robot 110 an address, index, or other data enabling the robot 110 to retrieve the enhanced path data 136 from the database 108.

During stage (F), the robot 110 receives the enhanced path data 136. The enhanced path data 136 can be stored in the local memory of the robot 110. In some implementations, if the robot 110 determines that the server system 104 transmitted an address or other data for retrieving the enhanced path data 136 from the database 108, the robot 110 requests the enhanced path data 136 from the database 108.

In response to receiving the enhanced path data 136, the robot 110 initiates movement to travel along the path specified by the enhanced path data 136. As depicted in representation 121, the robot 110 can traverse a path 138 that travels from a starting location to the ending location while avoiding obstacles 118 and 120. The path 138 shown is the enhanced path that has been generated by cutting out sharp corners, and each of the angles of the corners in the path 138 is greater than a predetermined threshold. Thus, the path 138 enables the robot 110 to reach the destination quickly and without traversing excess distance.

In some implementations, the robot 110 can transmit information regarding traversal of the path 138 to the server system 104 over the network 106. For example, the robot 110 can indicate whether new obstacles are found or whether previously identified obstacles have been moved. Additionally, the robot 110 can indicate whether the user had provided the robot 110 with a new instruction while traversing the path 138. The robot 110 can also indicate whether traversing the path 138 was successful or not.

Figure 2:
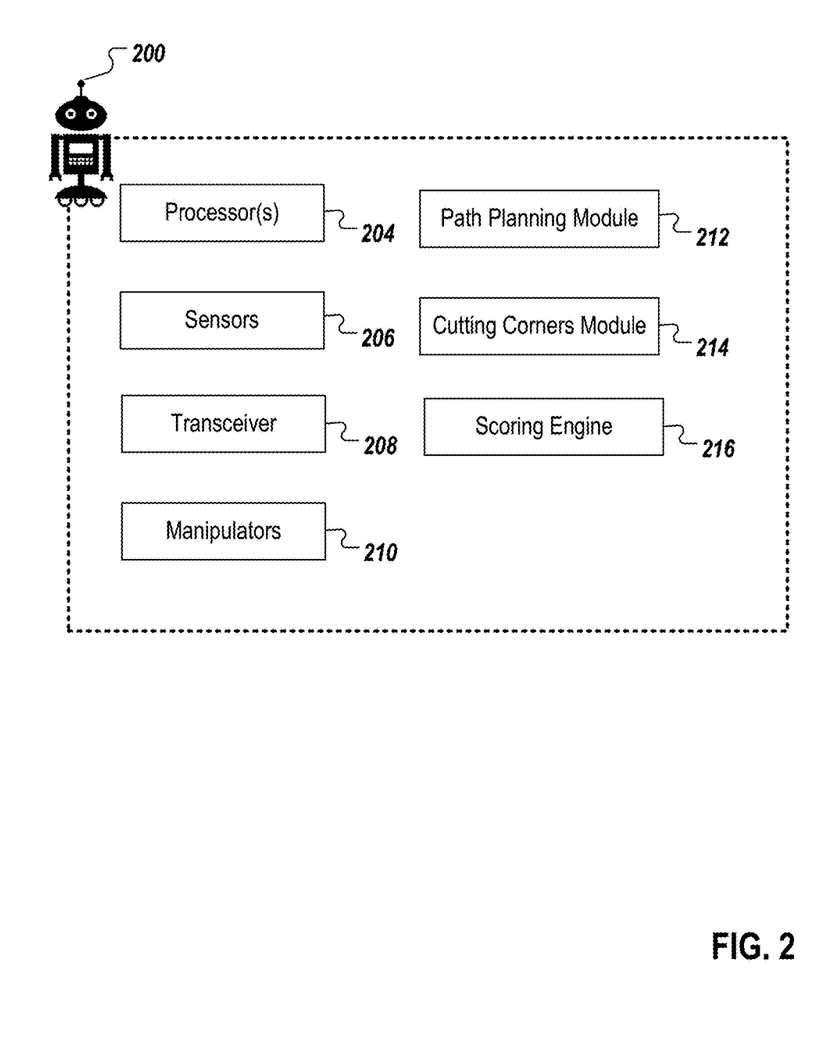
FIG. 2 is a block diagram that illustrates an example of a robot and corresponding components.

FIG. 2 is a block diagram that illustrates an example of a robot 200 and corresponding components. The system 200 illustrates one or more components integrated with the robot 200. For example, the robot 200 can include one or more processors 204, one or more sensors 206, a transceiver 208, one or more manipulators 210 connected to the end of the robot 200's arms, a path-planning module 212, a corner-cutting module 214, and a scoring engine 216. The robot 200 can additionally include other components as well. Each of the components in the robot 200 can communicate with one another.

The one or more processors 204 control the decision making of the robot 200. In addition, the one or more processors 204 communicate with each of the other components in the robot 200. Additionally, the processors 204 communicate with one or more memory components found in the robot 200. The processors can instruct each of the components in the robot 200 to perform desired tasks and respond to requests.

The one or more sensors 206 can analyze the environment within proximity to the robot. For example, the robot 110 can include sensors such as a camera, a LIDAR sensor, a proximity sensor, an infrared sensor, an accelerometer, a touch sensor, a microphone, a depth camera, and a position sensor, to name a few examples. The robot 110 can generate data that includes LIDAR, 3D depth, radar data, imagery, and audio data, to name a few examples. The sensors 206 can be placed internally on the robot 110 or externally on the robot 110.

The transceiver 208 can include one or more receivers and one or more transmitters. The transceiver 208 can allow the robot 110 to communicate bi-directionally over the network 106 with external components. The transceiver 208 can work over different frequency bands and can be connected by a wired connection over the network 106.

The one or more manipulators 210 can be attached to the end of each of the robot 200's arms. For example, the end of robot 200's arms can include one or more manipulators 210 that perform tasks in response to instructions transmitted by the processors 204. The one or more manipulators 210 can be instructed to open and/or close to grasp an object or release its grasp on an object. The manipulators 210 may have finger like or clamp like objects to grasp objects.

In the example of FIG. 1, the server system 104 was illustrated as performing path planning, including optimization using the corner-cutting technique. FIG. 2 shows that these techniques can optionally be performed by a robot in some implementations, using an optional path-planning module 212, an optional corner-cutting module 214, and an optional scoring module 216.

The path-planning module 212 can include one or more software and hardware components that executes a path-planning algorithm and generates a shortcut path, as described with respect to FIG. 1. For example, path-planning module 212 can use a mapped environment, generated by the processors 204 and execute one or more path-planning algorithms to move from a starting location to an ending location. For example, the one or more path-planning algorithms can include A*, Dijkstra's algorithm, forward search, backward search, bidirectional search, value iteration, and logic-based planning. In response to the path-planning module 212 generating a path from the path-planning algorithm, the path-planning module 212 generates one or more shortcut paths. For example, the path-planning module 212 shortens the distance provided by the results of the path-planning algorithm in generating the shortcut path. For example, the path-planning module 212 generates the shortcut path by generating one or more straight-lined paths that connect together to traverse a path generated by the path-planning algorithm from a starting location to the ending location while avoiding the one or more obstacles.

The corner-cutting module 214 can include one or more software and hardware components that execute a corner-cutting algorithm to generate cutting corners path data, as described with respect to FIG. 1. For example, the corner-cutting module 214 generates enhanced data by isolating the corners from the shortcut path. For example, the corner-cutting algorithm seeks to bypass the sharp angles found along the shortcut path. As described with respect to FIG. 1, in response to identifying a sharp angle along the path, the corner-cutting module 214 cuts the identified corner and generates a line (and attaches the line to path) that is farthest away from the identified corner while avoiding one or more obstacles. The corner-cutting module 214 iteratively performs this process until the magnitude of the angle of each identified corner along a path is greater than a predetermined threshold.

The scoring engine 216 can include one or more software and hardware components that executes scoring a generated path by the corner-cutting module 214. The scoring engine 216 generates a score for an enhanced path from the corner-cutting module 214. For example, the scoring engine 216 generates the score for the enhanced path based on the smoothness of the enhanced path, the shortness of the enhanced path, a number of turns found on the enhanced path, and the magnitude of each angle found along the enhanced path. For example, the smoother and the shorter the enhanced path is, the higher the score generated by the server system 104. Alternatively, if the enhanced path is less smooth (e.g., indicative of zig-zagging, a saw-tooth pattern, or choppy movement) or if the path is too long, the server system 104 generates a lower score. In some implementations, the server system 104 can generate multiple enhanced paths (that may be different for each other) for a single environment. The server system 104 can select the enhanced path with the enhanced path with the highest score to store and/or provide to the robot 110.

Figure 3:
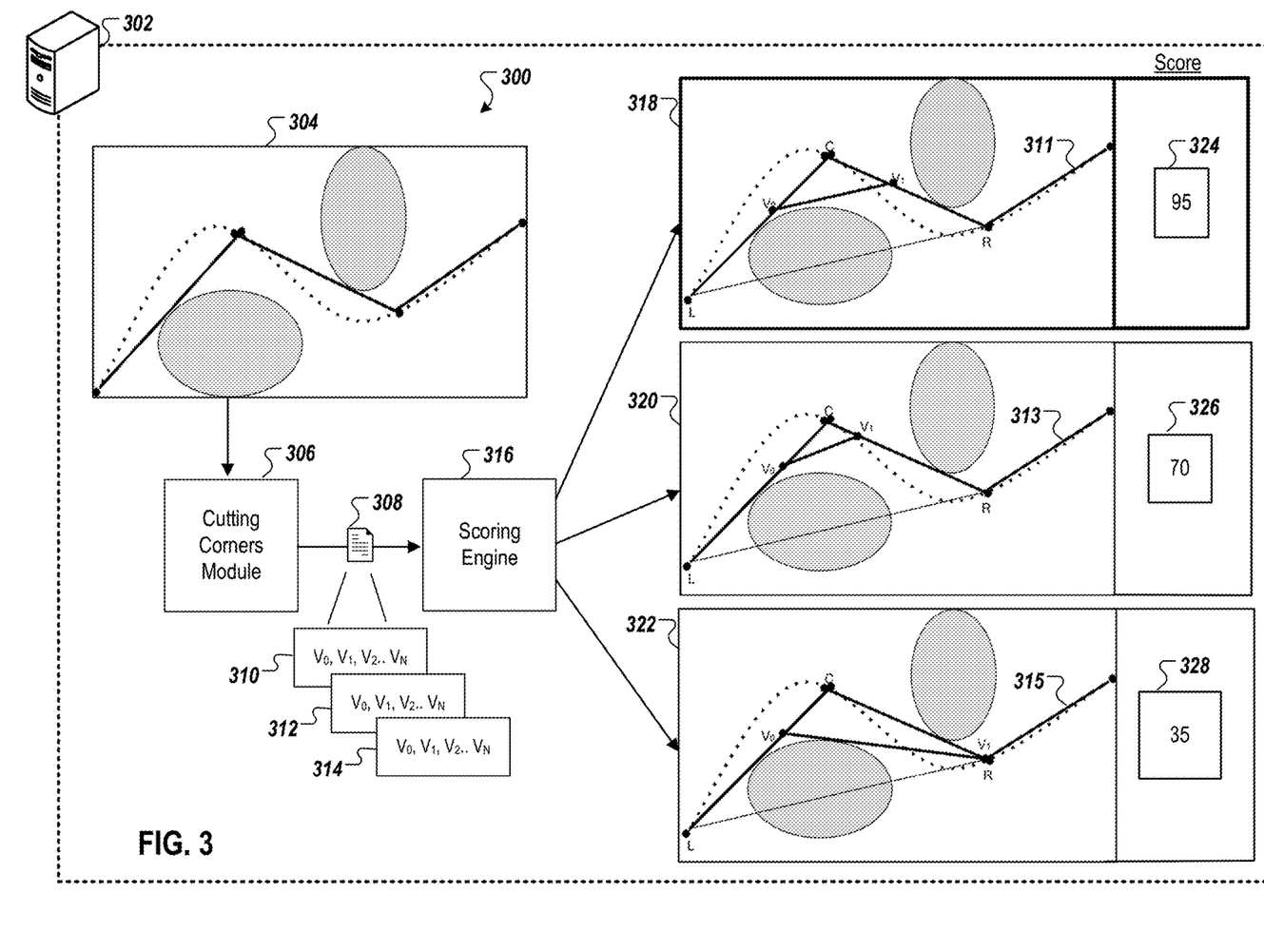
FIG. 3 is a block diagram that illustrates an example of a system for scoring paths.

FIG. 3 is a block diagram that illustrates an example of a system 300 for scoring paths. For example, the system 300 illustrates the functions performed by a corner-cutting module 308 that enhances shortcut paths and a scoring engine 314 that assigns scores to paths enhanced with different bypass segments. The functions performed by the server system 302 include use the path-planning module to generate the paths as illustrated in representation 304. The server system 302 provides the representation 304 (e.g., including the paths) to the corner-cutting module 306.

The corner-cutting module 306 analyzes paths included in the representation 304 and generates enhanced path data 308. In some implementations, the corner-cutting module 306 generates enhanced path data 308 that include multiple paths for representation 304. For example, the enhanced path data 308 can include points 310 corresponding to a path, points 312 corresponding to a path, and points 314 corresponding to a path. Each path is denoted by a series of vertices $V_0, V_1, V_2, \ldots V_N$. These vertices represent location coordinates along the enhanced path generated by the corner-cutting module 306.

In some implementations, the corner-cutting module 306 provides the enhanced path data 308 to the scoring engine 316. The scoring engine 316 generates a score for each respective enhanced path. For example, as illustrated in system 300: the path 311 corresponds to points 310; the path 313 corresponds to points 312; and, the path 315 corresponds to path 314. The scoring engine 316 generates a score based on an indication of, for example, smoothness, distance, a number of turns, and/or the magnitude of angles found along the path. In the example, the scoring engine 316 generates a score 324 having a value of "95" for the path 311. The scoring engine 316 generates a score 326 having a value of "70" for the path 313. Additionally, the scoring engine 316 generates a score 328 having a value of "35" for the path 315. In some implementations, the scoring engine 316 can generate the score also based at least in part on how close the bypass lines are to a parallel orientation with respect to one or more reference lines. For example, as illustrated in scoring set 318, the scoring engine 316 generates a score 324 of "95" by analyzing how parallel the line from $V_0$ to $V_1$ is to line LR.

As shown in scoring sets 320 and 322, the lines from $V_0$ to $V_1$ are less parallel to their corresponding LR lines. Additionally, scoring set 320 includes a lower score than scoring set 318 because scoring set 320's enhanced path is longer than scoring set 318's enhanced path. As illustrated in FIG. 3, the line from $V_0$ to $V_1$ in scoring set 320 traverses to a point higher on CR than does the line from $V_0$ to $V_1$ in scoring set 318, thus resulting in a longer overall path. The line from $V_0$ to $V_1$ in scoring set 322 is less parallel to its corresponding line LR as compared to the line from $V_0$ to $V_1$ in scoring sets 318 and 320, thus generating a low score 328 of "35."

Figure 4:
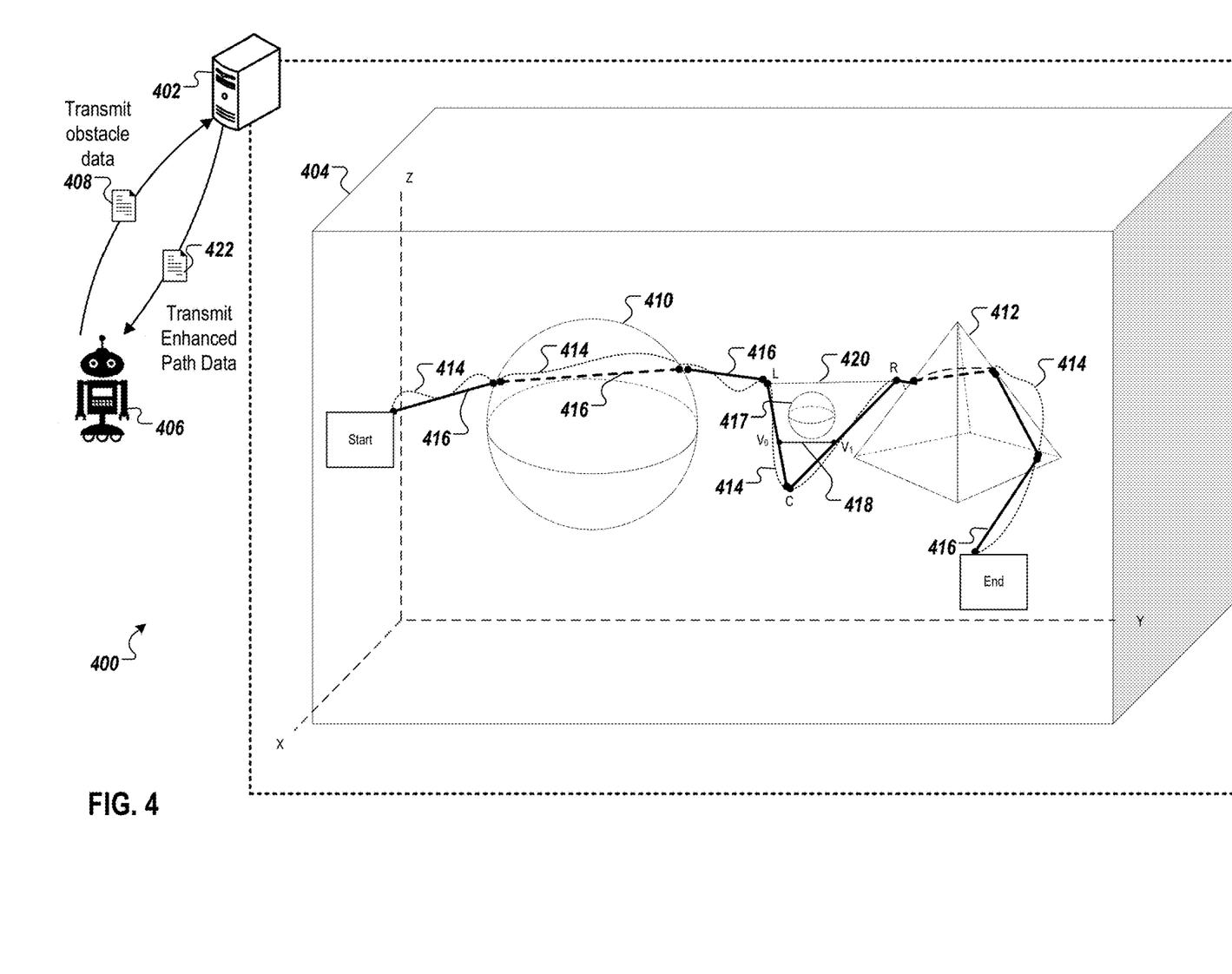
FIG. 4 is a block diagram that illustrates another example of a system for enhanced path planning.

FIG. 4 is a block diagram that illustrates another example of a system 400 for enhanced path planning. In the system 400, a server system 402 and a robot 406 can have the features described for the server system 102 and the robot 110 of the system 100 described with respect to FIG. 1. For example, the robot 406 can have an objective of moving an arm from a starting location to an ending location in environment 404 without colliding into any obstacles. FIG. 4 illustrates that the processing to generate a path, including cutting corners to enhance a path, may be done for movement in three dimensions and is not limited to movement along a two-dimensional area.

The robot 406 can analyze is environment using one or more sensors and determine that the robotic arm cannot move from the starting location to the ending location in a straight-line path. The robot 406 determines that the robotic arm must avoid obstacles 410, 412, and 417 while traversing a path. The robot 406 generates feature data from its sensor data captured by the one or more sensors.

In some implementations, the robot 406 can generate the feature data that indicate characteristics of the environment. For example, the robot 406 can capture characteristics of sensor data of the individual obstacles, walls, floors, and ceilings in proximity to the straight-lined path. After the robot 406 captures the sensor data, the robot 406 can generate feature data from the obtained characteristics of the sensor data. The robot can transmit the feature data 408 to server system 402. In response to the server system 402 receiving the feature data 408, the server system 402 executes the functions of the path-planning module, the corner-cutting module, and the scoring engine discussed above.

As illustrated in system 400, the server system 402 can generate a path 414 using one or more path-planning algorithms. A candidate path 414, as illustrated by the small dotted lines in system 401, extends from the starting location and proceeds to travel around the obstacle 410. Following the obstacle 410, the path 414 extends underneath the obstacle 417 (e.g., in the Z direction). Lastly, the path 414 extends around the obstacle 412 to reach the ending location. In some implementations, the path-planning algorithm may generate other paths. Alternatively, the path-planning algorithm may generate one path.

The server system 402 can then generate a shortcut path. The server system 402 shortens the distance provided by the result of the path-planning algorithm. For example, the server system 402 generates a path 416 that includes one or more connected straight line segments that form a path from the starting location to the ending location while avoiding the obstacles 410, 412, and 417. The line segments may be selected to define a path as close as possible to obstacles without colliding with the obstacles, potentially within other constraints as well. For example, the path 416 as illustrated by the thick dotted line traverses along certain points of the path 414, behind obstacle 416, underneath the obstacle 417, and behind the obstacle 412 to the ending location.

Using the path 416, the server system 402 executes the corner-cutting algorithm to generate cutting corners path data. For example, the server system 402 identifies the sharpest corner along the path 416 and determines whether to remove the corner from the path 416. For example, as illustrated in environment 404, the server system 402 determines that angle LCR is the sharpest angle. The server system 402 compares the magnitude of the angle LCR to a predetermined threshold. The predetermined threshold indicates whether the cutting corners path algorithm can keep or remove the identified corner. If the magnitude of the angle is greater than the predetermined threshold, then the server system 402 indicates that the identified angle does not need to be removed. Alternatively, if the magnitude of the angle is less than the predetermined threshold, then the server system 402 indicates that the identified angle is too sharp and is to be removed. In response to determining that the identified angle is too sharp, the server system 402 generates a line 420 between a preceding vertex (e.g., vertex L) and a subsequent vertex (e.g., vertex R). Then, the server system 402 generates a line that is parallel to LR and is farthest away from the point C without colliding with the obstacle 417. For example, the server system 402 generates a point $V_0$ on the line LC, a point $V_1$ on the line CR, and draws a line 418 between the points $V_0$ and $V_1$. Thus, the new enhanced path removes corner C on path 416 and replaces that distance with a line segment 418.

The server system 402 can transmit the enhanced path data 422 to the robot 406. The robot 406 can carry out movement along the path specified by the enhanced path data 422 received from the server system 402. For example, the robot 406 can maneuver its arm through the environment 404, in three-dimensions, as specified by the enhanced path data 422 to move from the starting location to the ending location while avoiding each of the obstacles 410, 412, and 417.

Figure 5:
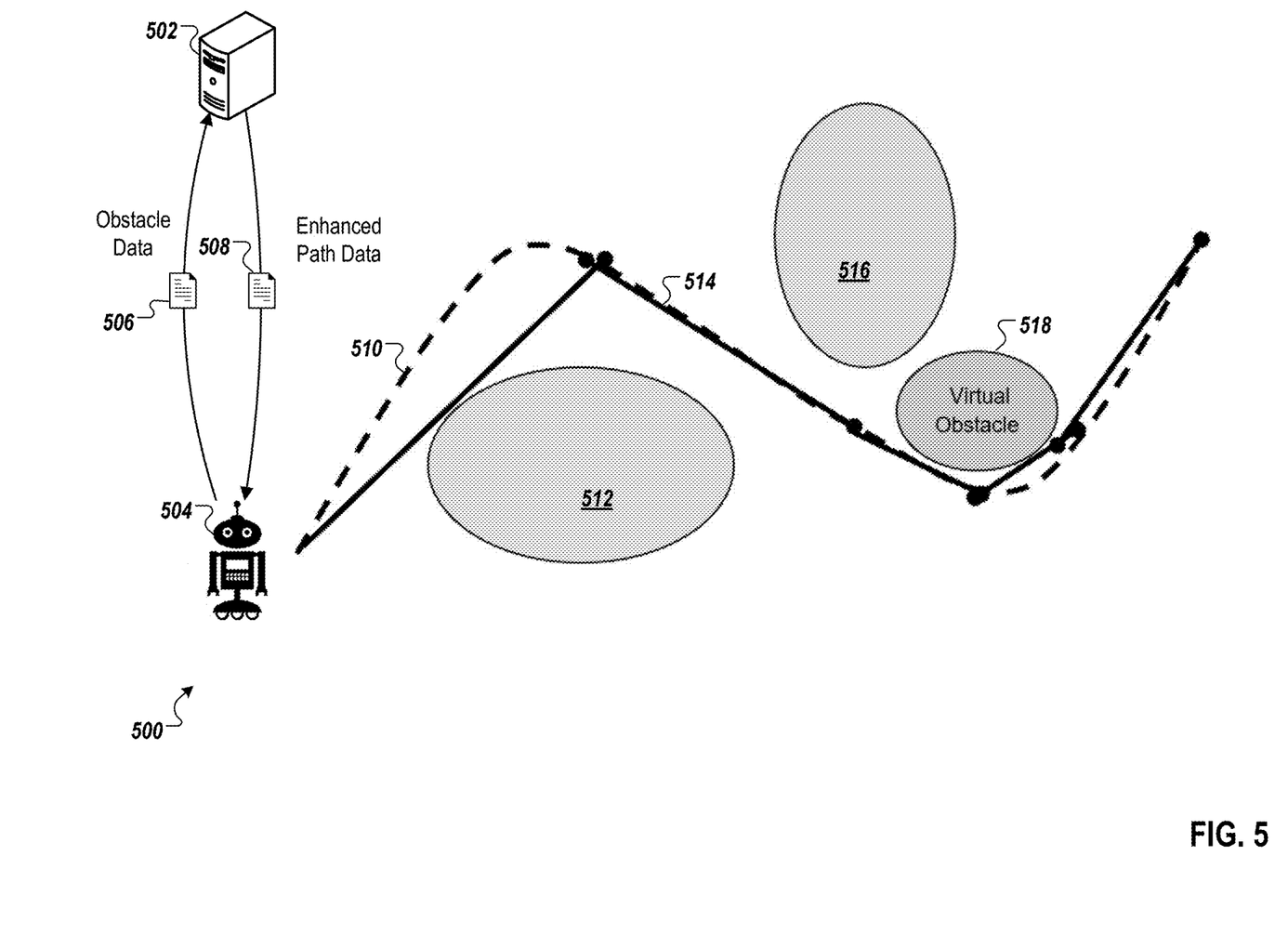
FIG. 5 is a block diagram that illustrates an example of a system for enhanced path planning using virtual obstacles.

FIG. 5 is a block diagram that illustrates an example of a system 500 for enhanced path planning using virtual obstacles. The system 500 can use virtual obstacles to represent constraints, preferences, or conditions other than physical obstacles. System 500 can include the same path planning capabilities described above for systems 100, 300, and 400. For example, the robot 504 generates obstacle data 506 from the environment in response to determining that the robot 504 cannot move in a straight-lined path without colliding with one or more obstacles. The obstacle data 506 can include feature data, raw sensor data, and locations and characteristics of obstacles 512 and 516. The robot 504 can transmit the generated obstacle data 506 to the server system 502.

In some implementations, the server system 502 adds one or more virtual obstacles to the path planning process. The virtual obstacles are not obstacles found by the robot 506 when scanning the environment, but rather representations of other constraints on the path planning process. For example, a virtual obstacle may indicate user's preference for avoiding a certain area of a workspace. As another example, a virtual obstacle may indicate a preference to avoid a high-traffic area where people, robots, vehicles, or other object may pass. As another example, a virtual obstacle may represent an expected region that another robot or object is expected to pass during the same or similar time that the robot 504 is traversing the path.

In some implementations, a user can indicate one or more constraints on a robot path, and the server system 502 can represent those constraints as virtual obstacles. The user may interact with a client device through an application to indicate path constraints. For example, the server system 502 may provide data for a map representation of the environment for display by a client device. The generated mapped environment can include a three-dimensional space viewed by the robot as the robot determines a path from a starting location to an ending location. The three-dimensional space can include one or more obstacles, one or more characteristics of the environment, such as walls, floors, and ceilings, and one or more individuals of the environment. The generated mapped environment can be a representative version of the environment within proximity to the robot. For example, the representative version can be a pixelated version, a caricature version, or a blocked version of the environment.

The client device can display an application that allows a user to interact with the mapped environment. For example, the user can interact with the mapped environment to draw one or more virtual obstacles. The user can insert one or more virtual obstacles as a particular shape or region drawn by the user. The user can draw the shape to prevent the robot from colliding with a potential safety hazard or if a component of the robot does not properly move due to an issue with the robot.

Once the virtual obstacle 518 has been defined, the server system 502 generates a candidate path 510, a shortcut path 514, and further generates an enhanced path using a corner-cutting module, and scores the output from the corner-cutting module. Each of these processes can be configured to determine paths that avoid the virtual obstacle. The server system 502 transmits the enhanced path data 508 to the robot 506 over a network, and the robot 504 can then carry out movement along the indicted path.

Figure 6:
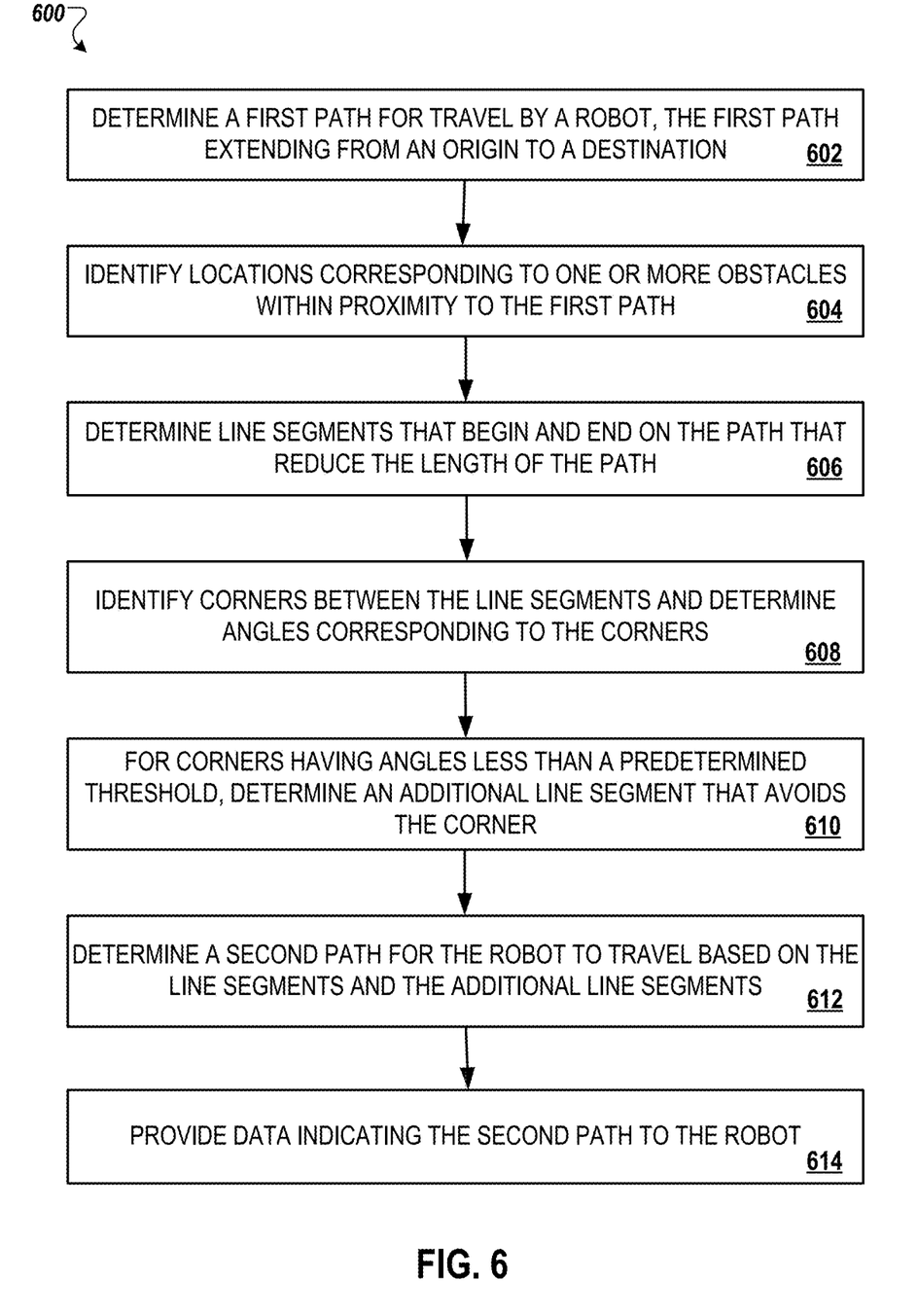
FIG. 6 is a flow diagram that illustrates an example process for enhanced path planning.

FIG. 6 is a flow diagram that illustrates an example process 600 for enhanced path planning. The process 600 may be performed by one or more computing devices, for example, a local computer system separate from a robot, a remote computer system, processors of the robot, or any combination thereof. In the description below, this is noted by reference to a computing system that can represent any of these computing devices or combinations.

During step 602, a first path for a robot to travel is determined, with the first path extending from an origin to a destination. For example, the robot may receive an instruction to move in the first path that extends from the origin (e.g., a robot's current location or another location where the robot may begin the path in the future) to the destination. The origin and destination can be defined by a coordinates, such as GPS coordinates.

The robot can determine the first path for travel from using one or more sensors located on its chassis (e.g., externally or internally on the robot). For example, the robot 110 can include RGBD sensors that capture characteristic data of the environment that includes obstacles. Additionally, the robot can include sensors that generate, LIDAR, 3D depth data, or radar data captured by the robot, and can aid the robot in three-dimensional characteristics (include volume and contour) of the one or more obstacles. The robot 110 can also capture audio data and or other data while analyzing the environment. The robot 110 can include sensors such as a camera, a LIDAR sensor, a proximity sensor, an infrared sensor, an accelerometer, a touch sensor, a microphone, a depth camera, and a position sensor, to name a few examples.

During step 604, locations of one or more obstacles in proximity to the first path are identified. The robot can use its one or more sensors to identify the obstacles, location of the obstacles, and characteristic data of the obstacles. The obstacles include a particular shape, color, size, contour, location, and texture that the robot 110 uses to aid in analyzing the environment. Additionally, the robot 110 can identify location of the obstacles that intersect with the determined first path. For example, based on the determined first path, the robot 110 can determine one or more GPS location coordinates of the location where the obstacles intersect with the determined first path. In response to using the sensors to identify data corresponding to the obstacles and corresponding to one or more locations where the obstacles intersect the first determined path, the robot 110 stores these locations in memory.

During step 606, line segments are determined that begin and end on the path that reduce the length of the path. The computing system can generate a mapped environment of the system using the feature data 112, include the starting location of the robot, an origin of the starting location of the path, the destination of the path, locations of characteristics of the environment, and location of one or more obstacles found in the environment. The map can be a computer-generated environment that the computing system can interact with to generate path data for maneuvering the robot. Using the mapped environment, the robot 110 can employ a combination of path-planning algorithms for generating from an origin to a destination while avoiding obstacles. The computing system can use one or more path-planning algorithms that include, for example, A*, Dijkstra's algorithm, forward search, backward search, bidirectional search, value iteration, and logic-based planning. The generated path from the origin to the destination can be, for example, path 126 that avoids both obstacles 118 and 120. The path-planning algorithms can take into considering the location of the obstacles while generating the shortest path possible to the end location. In response to generating the path 126, the computing system can generate a shortcutting path. For, example, a shortcut path 128 is generated. The path 128 include one or more straight-lined paths or line segments that connect together to traverse the path 128 from the starting location to the ending location while avoiding the obstacles. Additionally, the path 128 can traverse as close as possible to one or more obstacles without colliding with the obstacles. For example, the path 128 may include a first segment, a second segment, and a third segment that connects from the origin to the destination.

During step 608, corners are identified between the line segments and angles are determined corresponding to the corners. Continuing with the example from above, the computing system can generate cutting corners path data by isolating the corners from the shortcut path. For example, the cutting corners path algorithm identifies corners and seeks to reduce the number of sharp angle found along the path 128. The computing system traverses the path in the mapped environment to determine a corner along the path 128. The corners are identified based on a turn the robot would have to take while traversing path 128. For example, the angles can be determined by determining the angle between two line segments along the path 128. In response to identifying the angles (e.g., including the smallest angle), the computing system labels that angle.

During step 610, for corners having angles less than a predetermined threshold, an additional line segment is determined that bypasses the corner. Once the angles are determined, each of the angles is compared to a predetermined threshold. For each corner having an angle value less than the predetermined threshold (e.g., indicating a sharper corner), the computing system proceeds to remove that corner from path 128. For example, the computing system removes that corner from path 128 to generate a smoother and shorter line. The server generates a reference line that traverses between a preceding corner and a subsequent corner of the identified corner. The server generates a line segment that is parallel to the reference line that is farther away from the identified corner and free of collision from obstacles in the environment. For example, as illustrated in FIG. 1, the server generates a line segment 132 that is parallel to line 134. Line segment 132 is a new line segment along the path. The computing system performs this generation of a new line segment for each angle that is less than the predetermined threshold until each angle is no longer less than the predetermined threshold.

During 612, a second path is determined for the robot to travel based on the line segments and the additional line segments. Once each angle on the path is no longer less than the predetermined threshold, the computing system then proceeds to score the path. Scoring of the path can be based on an indication of a path's smoothness, shortness, number of turns, distance, and the magnitude of each angle found along the enhanced path. For example, the score of the enhanced path increases and decreases based on the value of each of these factors. After the score has been generated, the computing system can generate and enhanced paths and score each of the generated enhanced paths. The computing system can then select the enhanced path with the highest score to provide to the robot.

During 614, data is provided indicating the second path to the robot. The computing system can transmit the enhanced path from the cutting corners path algorithm to the robot over the network. The enhanced path from the cutting corners path algorithm can include GPS location data and various points along the path. In response to the robot receiving the enhanced path, the robot can execute enhanced path, and can traverse the enhanced path from the origin to the destination. The enhanced path includes the shortest path to reach the ending location with corners cut, where each of the angles of the corners is greater than a predetermined threshold, and the robot can traverse the path with minimal delay. Alternatively, the data provided can by a series of instructions that cause the robot to travel along the second path.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   determining a first path for travel by a robot, the first path extending from an origin to a destination;
   determining path segments based on the first path;
   determining that a corner between two of the path segments has an angle less than a predetermined threshold;
   in response to determining that the corner between two of the path segments has an angle less than the predetermined threshold, determining a bypass path segment that bypasses the corner, wherein determining the bypass path segment that bypasses the corner comprises:
      identifying a first vertex of the path segments that is located before the corner;
      identifying a second vertex of the path segments that is located after the corner; and
      determining the bypass path segment to have an orientation parallel to a line between the first vertex and the second vertex;
   determining a second path for the robot to travel based on the path segments and the bypass path segment; and
   providing, to the robot, data indicating the second path.

2. The method of claim 1, wherein determining path segments based on the first path comprises determining a series of connected line segments that each begin and end on the first path, wherein the series of connected line segments provides a path that reduces the length of the first path.

3. The method of claim 1, comprising identifying a location of an obstacle in proximity to the first path;
   wherein the bypass path segment is determined based at least in part on the location of the obstacle.

4. The method of claim 1, comprising identifying a location of an obstacle in proximity to the first path;
   wherein the bypass path segment is positioned away from the corner up to a predetermined clearance from the obstacle.

5. The method of claim 1, wherein the path is a path for movement of a robotic arm of the robot.

6. The method of claim 1, wherein the path is a path for locomotion of the robot.

7. The method of claim 1, comprising:
   identifying each corner between the path segments;
   determining an angle of each identified corner;
   comparing each angle to an angle threshold; and
   based on the comparisons, determining a bypass line segment to bypass each corner having an angle that is less than the angle threshold.

8. The method of claim 1, wherein determining the first path for travel by the robot further comprises generating, by the one or more computers, mapping data provided by the data indicating one or more obstacles in proximity to the first path.

9. The method of claim 1, wherein determining the second path comprises determining a second path that specifies movement in two dimensions.

10. The method of claim 1, wherein determining the second path comprises determining a second path that specifies movement in three dimensions.

11. The method of claim 1, wherein determining the second path comprises determining a second path that specifies movement along six dimensions.

12. The method of claim 1, wherein determining the bypass line segment comprises:
generating a bypass line segment that is parallel to a line between two other vertices along the path segments, wherein the additional line segment is placed as far away from the corner and as close to an obstacle as allowable without colliding with the obstacle.

13. The method of claim 1, further comprising:
generating, by the one or more computers, data indicating one or more virtual obstacles, wherein the second path is generated to avoid the regions corresponding to the one or more virtual obstacles.

14. The method of claim 1, wherein the data representing the second path is defined in Cartesian space, and movement along the second path represents translational movement.

15. The method of claim 1, wherein the data representing the second path is defined in a rotational space or a joint movement space, and movement along the second path represents rotation or articulation of a joint.

16. The method of claim 1, wherein determining the bypass path segment comprises determining the bypass path segment based on:
an amount of area of a triangle defined by the path segments that define the corner,
a path distance along the path segments, and
an amount of area within the triangle that would be removed by the bypass path segment.

17. A system comprising:
one or more computers; and
one or more computer-readable media comprising instructions that, when executed by the one or more computer-readable media, cause the one or more computers to perform operations comprising:
determining a first path for travel by a robot, the first path extending from an origin to a destination;
determining path segments based on the first path;
determining that a corner between two of the path segments has an angle less than a predetermined threshold;
in response to determining that the corner between two of the path segments has an angle less than the predetermined threshold, determining a bypass path segment that bypasses the corner, wherein determining the bypass path segment that bypasses the corner comprises:
identifying a first vertex of the path segments that is located before the corner;
identifying a second vertex of the path segments that is located after the corner; and
determining the bypass path segment to have an orientation parallel to a line between the first vertex and the second vertex;
determining a second path for the robot to travel based on the path segments and the bypass path segment; and
providing, to the robot, data indicating the second path.

18. The system of claim 17, wherein determining path segments based on the first path comprises determining a series of connected line segments that each begin and end on the first path, wherein the series of connected line segments provides a path that reduces the length of the first path.

19. One or more non-transitory computer-readable media comprising instructions that, when executed by the one or more computer-readable media, cause the one or more computers to perform operations comprising:
determining a first path for travel by a robot, the first path extending from an origin to a destination;
determining path segments based on the first path;
determining that a corner between two of the path segments has an angle less than a predetermined threshold;
in response to determining that the corner between two of the path segments has an angle less than the predetermined threshold, determining a bypass path segment that bypasses the corner, wherein determining the bypass path segment that bypasses the corner comprises:
identifying a first vertex of the path segments that is located before the corner;
identifying a second vertex of the path segments that is located after the corner; and
determining the bypass path segment to have an orientation parallel to a line between the first vertex and the second vertex;
determining a second path for the robot to travel based on the path segments and the bypass path segment; and
providing, to the robot, data indicating the second path.

* * * * *